United States Patent Office 3,528,993
Patented Sept. 15, 1970

3,528,993
METHOD OF PREPARATION OF
DITHIOLIUM SALTS
George A. Reynolds, Rochester, N.Y., assignor to Eastman Kodak Company, Rochester, N.Y., a corporation of New Jersey
No Drawing. Filed Nov. 9, 1967, Ser. No. 681,929
Int. Cl. C07d 71/00; C03g 5/00
U.S. Cl. 260—327
10 Claims

ABSTRACT OF THE DISCLOSURE

A process for forming 3-substituted derivatives of 1,2-dithiolium salts useful in electrophotography which process involves the reaction of a 3-chloro-1,2-dithiolium salt with an oxygen-containing reactant such as hydroxyaryl and alkoxyaryl compounds or tertiary-aminoaryl compounds containing a hydroxy radical. The oxygen-containing reactant is meta-disubstituted when the reactant is hydroxy- or alkoxy-substituted benzene.

In one aspect this invention relates to a process for forming derivatives of 1,2-dithiolium salts.

Previously, several ditholium salts have been shown to undergo nucleophilic substitution reactions at the 3-position of the dithiolium ring. Such prior work was, however, concerned only with reactions involving the more reactive nucleophiles such as hydrazine, amines and anions of active methylene compounds. Furthermore, it was found that when aromatic amines containing hydroxy groups were employed in the previously known procedures, complications arose because of the reactivity of the hydroxy group with other necessary reactants.

It is, therefore, an object of this invention to provide a novel method for substituting at the 3-position of a dithiolium ring an aromatic amine containing a hydroxy group.

It is another object of this invention to provide a new process for obtaining nucleophilic substitution in the 3-position of a dithiolium ring with relatively unreactive nucleophilic reagents.

These and still other objects of the invention are accomplished by reacting a 3-chloro-1,2-dithiolium salt with an aryl compound having at least one hydrogen atom on the aryl nucleus and having substituted on the aryl nucleus hydroxy, alkoxy or hydroxydialkylamino radicals, with the provision that when the aryl compound is hydroxy- or alkoxy-substituted benzene, the compound is at least meta-disubstituted with the hydroxy or alkoxy radicals.

The 3-chloro-1,2-dithiolium salts useful in this invention are represented by the following structural formula:

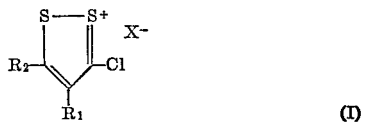

(I)

wherein X represents an acid anion such as perchlorate, chloride, bisulfate, methyl sulfonate etc. and $R_1$ and $R_2$ each represent hydrogen atoms; alkyl radicals of from 1 to 5 carbon atoms such as methyl, ethyl, isopropyl, isobutyl, neopentyl etc.; a monocyclic aromatic radical of the benzene series including phenyl and substituted phenyl having such substituents as halogens like chlorine, bromine etc.; alkyl and alkoxy radicals of from 1 to 5 carbon atoms for example, methyl, methoxy, ethyl, ethoxy, isopropyl etc.; or when taken together, a fused five or six membered heterocyclic ring in conjunction with the dithiolium ring, including fused rings substituted with lower alkyl radicals and lower alkoxy radicals having 1 to 5 carbon atoms and halogen atoms, as well as polycyclic fused rings. The heterocyclic main ring of the dithiolium cation is aromatic in character; however, for ease of representation, the aromaticity will be indicated simply by two double bonds with a resultant positive charge on a sulfur atom.

Typical 3-chloro-1,2-dithiolium salts useful in this invention include, among others, the chloride, perchlorate etc. salts of the following cations:

3-chloro-1,2-dithiolium
3-chloro-5-methyl-1,2-dithiolium
3-chloro-4,5-diethyl-1,2-dithiolium
3-chloro-4-propyl-5-butyl-1,2-dithiolium
3-chloro-4-neopentyl-1,2-dithiolium
3-chloro-4-methylamino-1,2-dithiolium
3-chloro-4-phenyl-1,2-dithiolium
3-chloro-5-tolyl-1,2-dithiolium
3-chloro-5-chlorophenyl-1,2-dithiolium
3-chloro-5-methoxyphenyl-1,2-dithiolium
3-chloro-4-benzamido-1,2-dithiolium
3,5-dichloro-4-phenyl-1,2-dithiolium
3,4-dichloro-5-bromophenyl-1,2-dithiolium
3-chloro-4-bromo-5-methoxyphenyl-1,2-dithiolium
3-chlorocyclopenta[d]-1,2-dithiolium
3-chlorobenzo[d]-1,2-dithiolium
3-chloronaphtho[1,2-c]-1,2-dithiolium The 3-chloro-1,2-dithiolium salts utilized in the present invention can readily be prepared from the corresponding 3H-1,2-dithiole-3-ones by reacting such ketones with a suitable reactant such as phosphorous oxychloride, phosgene, thionyl chloride etc. and separating out the salt thus formed. Among the many useful 3H-1,2-dithiole-3-ones are:

4-methyl-3H-1,2-dithiole-3-one
5-methyl-3H-1,2-dithiole-3-one
4,5-dimethyl-3H-1,2-dithiole-3-one
4-neopentyl-3H-1,2-dithiole-3-one
4-methyl-5-tert-butyl-3H-1,2-dithiole-3-one
4-neopentyl-5-tert-butyl-3H-1,2-dithiole-3-one
4-acetamido-3H-1,2-dithiole-3-one
4-(methylamino)-3H-1,2-dithiole-3-one
4-phenyl-3H-1,2-dithiole-3-one
5-phenyl-3H-1,2-dithiole-3-one
5-chloro-4-phenyl-3H-1,2-dithiole-3-one
4-p-tolyl-3H-1,2-dithiole-3-one
4-benzamido-3H-1,2-dithiole-3-one
cyclopenta[d]-3H-1,2-dithiole-3-thione
benzo[d]-3H-1,2-dithiole-3-thione
3,4-dihydronaphtho[1,2-c]-3H-1,2-dithiole-3-thione as well as the compounds represented structurally as follows:

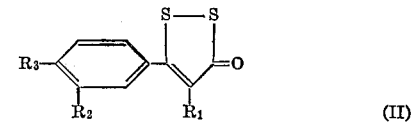

(II)

| $R_1$ | $R_2$ | $R_3$ |
|---|---|---|
| H | H | H |
| H | H | Cl |
| H | H | Br |
| H | H | CH$_3$O |
| H | Cl | CH$_3$O |
| Cl | H | H |
| Cl | H | Cl |
| Cl | H | Br |
| Cl | H | CH$_3$O |
| Cl | Cl | CH$_3$O |
| Br | H | H |
| Br | H | Cl |
| Br | H | Br |
| Br | H | CH$_3$O |

As mentioned above the monocyclic aryl compounds useful in connection with the present invention are at least meta-disubstituted so that the directive influences of the two substituents are additive. It is found that benzene derivatives containing only one substituent such as hydroxy, alkoxy or thioalkyl fail to undergo a reaction with compounds such as the chloro-dithiolium salts of Formula I above. However, the corresponding meta-disubstituted benzene derivatives, including those with two different substituents, readily undergo reaction with the compounds of Formula I. On the other hand, naphthalene derivatives containing only one group, such as hydroxy, readily react with compounds of Formula I.

In those instances in which various hydroxy derivatives of benzene and naphthalene are employed, a possibility exists that the dithiolium salt will substitute at either an oxygen atom or a carbon atom as shown below with β-naphthol:

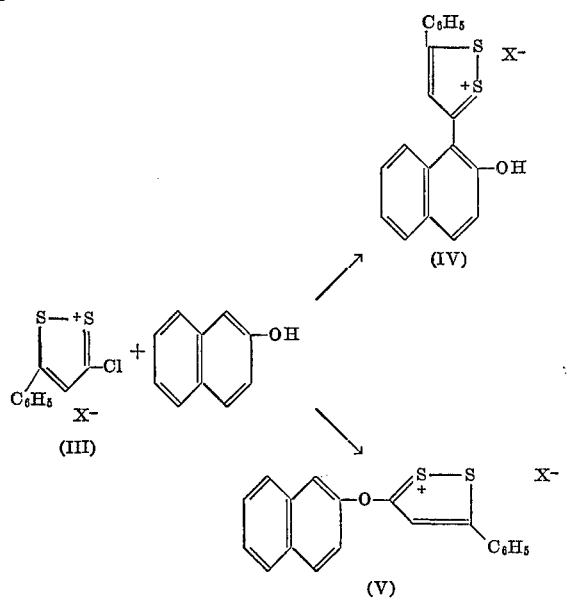

However, it is demonstrated that substitution occurs at the carbon atom to yield the compound of Formula IV, in view of the fact that the product shows a strong absorption in the hydroxy region of the infrared spectrum. Further confimation of substitution at the carbon atom is given by the fact that addition of a base to a solution of the reaction product results in elimination of perchloric acid (when X is $ClO_4^-$, for example), and the formation of the dye shown below as Formula VI.

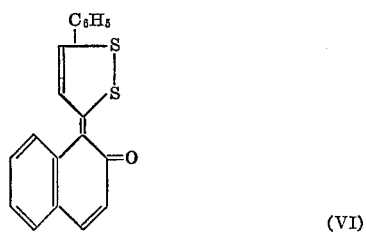

The aryl compounds useful as reactants with the dithiolium salts in accordance with the present invention are those monocyclic or polycyclic aromatic compounds having at least one unsubstituted carbon in the aryl nucleus and having substituted on the aryl nucleus an oxygen-containing radical selected from the group consisting of hydroxy radicals; alkoxy radicals of from 1 to 5 carbon atoms, such as methoxy, ethoxy, propoxy, isobutoxy, pentoxy, etc.; hydroxydialkylamino radicals having the formula

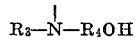

wherein $R_3$ is an alkyl or hydroxyalkyl group of from 1 to 5 carbon atoms, such as ethyl, isobutyl, hydroxymethyl hydroxypropyl etc., and $R_4$ is an alkylene radical of from 1 to 5 carbon atoms, such as methylene, ethylene, n-propylene, tert-butylene, neopentaylene etc., with the provision that when said aryl nucleus is monocyclic, and oxygen containing radical is hydroxy or alkoxy, then the aryl nucleous is meta-disubstituted therewith.

Among the aryl reactants useful in the present invention are those represented by the following general formulas:

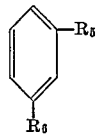 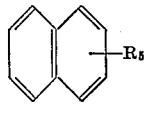

(VII)    (VIII)

wherein $R_5$ represents a group selected from the following:

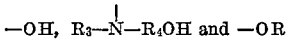

where R is an alkyl radical of from 1 to 5 carbon atoms such as methyl, ethyl, isopropyl, tert-butyl, neopentyl etc.; and wherein $R_6$ represents a group selected from the following: a hydroxy radical, an alkoxy radical of from 1 to 5 carbon atoms such as methoxy, ethoxy, propoxy, isobutoxy, neopentoxy etc., a radical of the formula

with $R_3$ and $R_4$ representing the same moieties as discussed above, and when $R_5$ is a hydroxy tertiaryamino group, $R_6$ can also be hydrogen.

Typical aryl reactants which can be reacted with the dithiolium salts in accordance with the present invention would include:

resorcinol, pyrogallol, m-methoxyphenol,
m-ethoxyphenol, 1,3-dimethoxybenzene,
1,3-dipropoxybenzene, 1,3-dipentoxybenzene
m-dimethylaminophenol, m-dipropylaminophenol,
N-ethyl-N-(β-hydroxyethyl)aniline,
N-methyl-N-ethyl-3-hydroxyaniline,
N-propyl-N-butyl-3-hydroxyaniline,
N-ethyl-N-pentyl-3-hydroxyaniline,
N-methyl-N-(β-hydroxyethyl)-m-toluidine,
1,3-bis[N-methyl-N-(β-hydroxymethyl)]aniline,
1,3-bis[N-ethyl-N-(β-hydroxypropyl)]aniline,
α-naphthol, β-naphthol,
1-methoxynaphthalene, 2-ethoxynaphthalene,
N-(β-hydroxymethyl)-N-methyl-2-naphthylamine, and
N-(β-hydroxyethyl)-N-propyl-1-naphthylamine.

The above aryl compounds are illustrative of just a few of the many aryl reactants that can be used in the present process.

The reaction of this invention is usually performed in a solvent which is inert with respect to the reactants involved and virtually any such inert solvent can be used. It has been found that among the common solvents, both acidic and neutral solvents can be employed, as the pH of the reaction mixture has litle or no effect on the reaction and can vary from a value of 0 to 7. Among the many suitable inert solvents are lower aliphatic organic acids, halogenated aromatic compounds, lower aliphatic nitriles etc. Such solvents as acetic acid, chlorobenzene and acetonitrile have proved to be very useful.

Other reaction conditions such as temperature and pressure are not critical and can vary considerably. Reaction temperature can range from about room temperature (i.e., 20° C.) to about 140° C. Actually the upper temperature is restricted only by the physical limits of the solvent, i.e., the temperature at which the solvent will rapidly evaporate or the temperature of decomposition, etc. Of course, as is usually the case with many reactions, the higher the temperature the more rapidly the reaction proceeds. Unless a short section time is desired, there is no criticality as to the reaction temperature. Similarly the pressure at which the reaction is conducted is also not very important and can vary considerably with little or no effect on the reaction. However, in order to simplify the necessary reaction apparatus and thus keep costs to a minimum, the reaction is generally conducted at atmospheric pressure.

The reaction of the 3-chloro-1,2-dithiolium cation and the various substituted aryl compounds generally proceeds well with about equal moles of each reactant, with a slight excess of aryl compound being desirable.

The process of this invention is further illustrated by the following additional examples which include preferred embodiments thereof.

EXAMPLE 1

A mixture of 15 g. (0.077 mole) of 5-phenyl-3H-1,2-dithiol-3-one and 40 ml. of phosphorus oxychloride is heated on a steam bath for one hour. After cooling, the mixture is diluted with two volumes of diethyl ether. The solid is collected and washed with ether. Next, the hydroscopic solid is dissolved in acetone and 5 ml. of 70% perchloric acid is added to the solution. A solid begins to separate at once. After the mixture has been sufficiently chilled, the solid is collected and recrystallized from acetone to yield 18 g. of a product having a melting point of 177–178° C. The theoretical values calculated for $C_9H_6Cl_2O_4S_2$ and the actual values are as follows. Theoretical: C, 34.6; H, 1.9; Cl, 22.4. Actual: C, 34.9; H, 2.1; Cl, 22.7.

EXAMPLE 2

A mixture of 0.01 mole (3.1 g.) of 3-chloro-5-phenyl-1,2-dithiolium perchlorate, as prepared in Example 1, with 0.015 mole of suitable hydroxyaryl or alkoxyaryl compound and 25 ml. of acetic acid is refluxed for three hours. The mixture is then cooled to room temperature and the solid is collected and recrystallized. Acetonitrile is a satisfactory recrystallization solvent for all of the compounds. The results of some of the reactions using various hydroxyaryl and alkoxyaryl compounds are seen in the following table opposite the structural formula of the compound which is formed. The starting aryl compounds used to produce the products of Table I are, respectively, β-naphthol, α-naphthol, 1,3-dimethoxybenzene, 1,3-dipentoxybenzene, pyrogallol, m-methoxyphenol and resorcinol.

TABLE I

3-Arylderivatives of 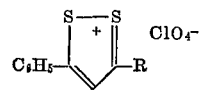

| R | M.P., °C. | Yield, percent | Empirical formula | Calculated C | Calculated H | Calculated N | Actual C | Actual H | Actual N |
|---|---|---|---|---|---|---|---|---|---|
| 2-hydroxy-1-naphthyl | 180–181 | 60 | $C_{19}H_{13}ClO_5S_2$ | 54.2 | 3.1 | 15.2 | 53.9 | 3.1 | 14.8 |
| 1-hydroxy-2-naphthyl | 279–280 | 63 | $C_{19}H_{13}ClO_5S_2$ | 54.2 | 3.1 | 15.2 | 54.2 | 3.2 | 14.9 |
| 2,4-dimethoxyphenyl | 230 | 72 | $C_{17}H_{15}ClO_6S_2$ | 49.4 | 3.6 | 15.5 | 49.6 | 3.6 | 15.3 |
| 2,4-dipentoxyphenyl | 162 | 38 | $C_{25}H_{31}ClO_6S_2$ | 57.0 | 5.9 | 12.2 | 56.7 | 6.0 | 12.1 |
| 2,3,4-trihydroxyphenyl | 239–240 | 64 | $C_{15}H_{11}ClO_7S_2$ | 44.8 | 2.7 | 15.8 | 44.7 | 3.0 | 15.7 |
| 2-hydroxy-4-methoxyphenyl | 231–232 | 61 | $C_{15}H_{13}ClO_6S_2$ | 46.9 | 3.2 | 15.6 | 47.2 | 3.6 | 15.9 |

TABLE I—Continued

3-Arylderivatives of 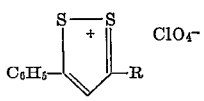

| R | M.P., °C. | Yield, percent | Empirical formula | Elemental analysis | | | | | |
|---|---|---|---|---|---|---|---|---|---|
| | | | | Calculated | | | Actual | | |
| | | | | C | H | N | C | H | N |
| ⎯OH (with OH) | 250–251 | 58 | $C_{15}H_{11}ClO_6S_2$ | 46.7 | 2.9 | 16.6 | 46.4 | 3.2 | 16.4 |

EXAMPLE 3

The procedure of Example 2 is repeated using each of the following aryl compounds: m-dimethylaminophenol, N-methyl-N-ethyl-3-hydroxyaniline, 1,3-bis[N-methyl-N-($\beta$-hydroxymethyl)]-aniline, N-ethyl-N-($\beta$-hydroxyethyl)-m-toluidine and N-methyl-N-($\beta$-hydroxymethyl)-2-naphthylamine. After collecting the solid, washing and recrystallizing, good yields of the respective 3-substituted 5-phenyl-1,2-dithiolium perchlorates are obtained.

EXAMPLE 4

The procedure of Example 1 (omitting the perchloric acid treatment) is repeated using thionyl chloride, in place of the phosphorous oxychloride, to produce 3-chloro-5-phenyl-1,2-dithiolium chloride. A mixture of 0.01 mole of the chloride thus formed with 0.015 mole of resorcinol and 25 ml. of chlorobenzene is refluxed for three hours. The mixture is cooled and the solid is collected and recrystallized in the presence of perchloric acid to give a satisfactory yield of product having a melting point of 250–251° C.

EXAMPLE 5

A mixture of 0.01 mole of 3-chloro-4,5-diethyl-1,2-dithiolium chloride with 0.015 mole of resorcinol and 25 ml. of acetic acid is heated on a steam bath for two hours. The mixture is cooled to room temperature, and the solid is collected and recrystallized. A good yield of product having an empirical formula of $C_{13}H_{15}ClO_2S_2$ is obtained. Similar results are obtained in accordance with the above procedure when each of the following are used:

3-chloro-5-methyl-1,2-dithiolium chloride,
3-chloro-4-neopentyl-1,2-dithiolium perchlorate,
3-chloro-4-phenyl-1,2-dithiolium perchlorate,
3-chloro-5-methoxy-phenyl-1,2-dithiolium perchlorate,
3,4-dichloro-5-bromophenyl-1,2-dithiolium perchlorate.

EXAMPLE 6

A mixture of 3 g. of 3-chloro-5-phenyl-1,2-dithiolium perchlorate with 2 g. of N-ethyl-N-($\beta$-hydroxyethyl) aniline and 25 ml. of acetic acid is heated on a steam bath for two hours. The mixture is then cooled and a solid isolated and recrystallized from acetic acid to give a good yield of a product having a melting point of 171–172° C. The theoretical values calculated for $C_{19}H_{20}ClNO_5S_2$ and the actual values are as follows: Theoretical: C, 51.6; H, 4.6; N, 3.2. Actual: C, 51.9; H, 4.5; N, 3.0.

EXAMPLE 7

Example 6 is repeated using N-ethyl-N-($\beta$-hydroxyethyl)-m-toluidene in place of the aniline derivative. A satisfactory yield of a product having a melting point of 185° C. is obtained. In addition to the above method, an alternate procedure which is satisfactory only for the alkoxy-substituted aromatic compounds is illustrated in the following example.

EXAMPLE 8

A mixture of 0.01 mole of 5-phenyl-1,2-dithiol-3-one, 0.015 mole of 1,3-dimethoxybenzene and 10 ml. of phosphorus oxychloride is refluxed for one hour and cooled. The solid is collected, washed with ether, dissolved in acetonitrile and 3 ml. of 70% perchloric acid is added to the solution. After dilution with ether and chilling, an 85% yield of 3-(2,4-dimethoxy-phenyl)-5-phenyl-1,2-dithiolium perchlorate is obtained.

The compounds of this invention have all been found to be useful in electrophotography. In particular, the compounds made in accordance with this invention are useful for sensitizing photoconductor-containing electrophotographic elements. This utility of these compounds is readily shown by the following example.

EXAMPLE 9

A photoconductive composition containing one of the following photoconductors:

(1) triphenylamine
(2) 1,3,5-triphenylpyrazoline
(3) 4,4'-bis(diethylamino)-2,2'-dimethyltriphenylmethane
(4) 2,3,4,5-tetraphenylpyrrole
(5) 4,4'-bis(diethylamino)benzophenone as the photoconductive material is prepared for coating on a conducting support material by mixing 0.15 part of the photo-conductor with 0.002 part by weight of one of the dithiolium salts and dissolving the mixture, together with 0.5 part by weight of a resinous polyester binder, with suitable stirring in dichloromethane. The resultant mixture is then hand coated on the aluminum of an aluminum-laminated paper support. In this example the polyester binder in the coating composition is a copolymer of terephthalic acid and a glycol mixture comprising a 9:1 weight ratio of 2,2'-bis[4-($\beta$-hydroxyethoxy)phenyl]-propane and ethylene glycol. The wet coating thickness on the support is 0.004 inch. After drying, a sample of each electrophotographic element is employed in a standard xerographic process which includes charging under a positive corona discharge until the surface potential of the sample, as measured by an electrometer probe, reaches 600 volts. Similarly, a sample of each element is charged under a negative source until the surface potential reaches 600 volts. Each of the samples is then exposed from behind a transparent stepped density gray scale to a 3000K tungsten source of 20 foot candle illuminance at the point of exposure. The exposure causes reduction of surface potential of the element under each step of the gray scale from its initial potential, $V_o$, to some lower potential, V, the exact value of which depends upon the actual amount of exposure received by each area. The results of these measurements are then plotted on a graph of surface potential V versus log exposure for each step. The actual speed of each element can then be expressed in terms of the reciprocal of the exposure required to reduce the surface potential to any fixed arbitrarily assigned value. Numerically, the speed is the quotient of $10^4$ divided by the exposure by 100 volts. The results of these speed measurements are given in the following Table II. A control sample comprising the resinous binder above and the sensitizer 4 - (4 - n-amyloxy-phenyl)-2,6-bis(4-ethylphenyl)thiapyrylium perchlorate has a speed of 14, on the same basis as referred to above, when charged positively for exposure.

TABLE II

| Dithiolium salt (perchlorates) | Photoconductor | Speed Positive | Negative |
|---|---|---|---|
| $C_6H_5$—[S—S+ ring]—[phenyl]—OH, OH | 1 | 50 | 50 |
|  | 2 | 52 | 20 |
|  | 3 | 20 | 16 |
|  | 4 | 16 | 12 |
|  | 5 | 40 | 20 |
| $C_6H_5$—[S—S+ ring]—[phenyl]—$OCH_3$, $OCH_3$ | 1 | 400 | 630 |
|  | 2 | 500 | 250 |
|  | 3 | 250 | 500 |
|  | 4 | 120 | 200 |
|  | 5 | 120 | 200 |
| $C_6H_5$—[S—S+ ring]—[phenyl]—OH, $OCH_3$ | 1 | 250 | 160 |
|  | 2 | 320 | 80 |
|  | 3 | 120 | 200 |
|  | 4 | 120 | 80 |
|  | 5 | 250 | 100 |
| $C_6H_5$—[S—S+ ring]—[naphthyl]—OH | 1 | 80 | 120 |
|  | 2 | 80 | 63 |
|  | 3 | 8 | 16 |
|  | 4 | 16 | 16 |
|  | 5 | 80 | 120 |

Similarly electrophotographic elements containing the remaining compounds of Examples 1–8 also give good results when charged, exposed and measured in the manner described above. The electrostatic latent images on each of such electrophotographic elements after imagewise exposure can be rendered visible by development with colored toner particles and fused in the usual manner.

The invention has been described in detail with particular reference to perferred embodiments thereof, but it will be understood that variations and modifications can be effected within the spirit and scope of the invention as described hereinabove and as defined in the appended claims.

I claim:

1. A process for preparing 3-substituted derivatives of 1,2-dithiolium salts comprising a reacting a 3-chloro-1,2-dithiolium salt with an aryl compound selected from the group consisting of benzene and naphthalene compounds having on the aryl nucleus a hydrogen atom and at least one oxygen-containing radical selected from the group consisting of a hydroxy radical, an alkoxy radical having from 1 to 5 carbon atoms and a hydroxy dialkylamino radical having from 1 to 5 carbon atoms in each alkyl moiety, wherein when said aryl nucleus is benzene and said oxygen-containing radical is selected from the group consisting of a hydroxy radical and an alkoxy radical having from 1 to 5 carbon atoms, then said benzene compound is at least meta-disubstituted with said oxygen-containing radicals.

2. A process for preparing 3-substituted derivatives of 1,2-dithiolium salts comprising reacting a chloroditholium salt chosen from the group having the general formula:

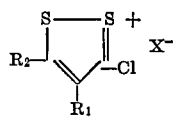

wherein $R_1$ and $R_2$ each represent hydrogen, an alkyl radical of 1 to 5, carbon atoms, a phenyl radical and substituted phenyl radicals having substituents selected from the group consisting of a halo radical, an alkyl radical of from 1 to 5 carbon atoms and an alkoxy radical having from 1 to 5 carbon atoms, or when taken together the carbon atoms necessary to form a fused ring selected from the group of cyclopentane, benzene and naphthalene and $X^-$ represents an acid anion, with an aryl compound selected from the group of benzene and naphthalene compounds having substituted on the aryl nucleus a hydrogen atom and at least one oxygen-containing radical selected from the group consisting of a hydroxy radical, an alkoxy radical having from 1 to 5 carbon atoms and a hydroxydialkylamino radical having from 1 to 5 carbon atoms in each alkyl moiety and wherein when said aryl nucleus is benzene and is substituted with a radical selected from the group consisting of a hydroxy radical and an alkoxy radical having from 1 to 5 carbon atoms, then said benzene compound is at least meta-disubstituted therewith, said reaction being conducted in an inert solvent.

3. A process as in claim 1 for preparing 3-substituted derivatives of 1,2-dithiolium salts wherein the salt is 3-chloro-5-phenyl-1,2-dithiolium perchlorate.

4. A process as in claim 1 wherein the salt is 3-chloro-5-ethyl-1,2-dithiolium-perchlorate.

5. A process as in claim 1 wherein the aryl compound is chosen from the group consisting of β-naphthol, resorcinol, 1,3 - dimethoxybenzene and N-ethyl-N-(β-hydroxyethyl)aniline.

6. A process as in claim 2 wherein the acid anion is chosen from the group consisting of $ClO_4^-$ and $Cl^-$.

7. A process for preparing 3-substituted derivatives of 1,2-dithiolium salts comprising the steps of reacting a 3-keto-1,2-dithiolium compound (A) with compound (B) selected from the group consisting of phosphorus oxychloride, phosgene and thionyl chloride, separating the reaction product of (A) and (B) and subsequently reacting said product with an aryl compound (C) selected from benzene and naphthalene compounds substituted with at least one radical selected from a hydroxy radical and a hydroxydialkylamino radical having from 1 to 5 carbon atoms in each alkyl moiety, said aryl compound having a hydrogen atom on the aryl nucleus and being at least meta-dihydroxy-substituted when said aryl compound is a benzene compound.

8. A process for preparing 3-substituted derivatives of 1,2-dithiolium salts comprising the steps of reacting a compound (A) chosen from the group consisting of compounds having the general formula:

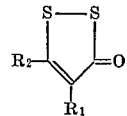

wherein:

$R_1$ is selected from the group consisting of hydrogen and alkyl radicals of from 1 to 5 carbon atoms, $R_2$ is selected from the group consisting of hydrogen, alkyl radicals of from 1 to 5 carbon atoms, a phenyl radical and substituted phenyl radicals having substituents selected from the group consisting of a halo radical, an alkyl radical of from 1 to 5 carbon atoms and an alkoxy radical having from 1 to 5 carbon atoms, with a compound (B) selected from the group consisting of phosphorus oxychloride, phosgene and thionyl chloride, and reacting the product of (A) and (B) with an aryl compound (C) selected from benzene and naphthalene compounds substituted with at least one radical selected from a hydroxy radical and a hydroxyldialkylamino radical having from 1 to 5 carbon atoms in each alkyl moiety, said aryl compound having a hydrogen atom on the aryl nucleus and being at least metadihydroxy-substituted when said aryl compound is a benzene compound.

9. A process for preparing 3-substituted derivatives of 1,2-dithiolium salts comprising reacting a 3-keto-1,2-dithiolium compound with an aryl compound selected from the group of alkoxy substituted benzene compounds and alkoxy substituted naphthalene compounds having from 1 to 5 carbon atoms in the alkyl moiety and having a hydrogen atom on the aryl nucleus, wherein when said aryl compound is benzene, said compound is at least meta-dialkoxy-substituted, and said reaction being conducted in the presence of a compound selected from the group consisting of phosphorus oxychloride, phosgene and thionyl chloride.

10. A process for preparing 3-alkoxyaryl derivatives of 1,2-dithiolium salts comprising reacting a compound chosen from the group having the formula:

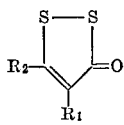

wherein:
$R_1$ and $R_2$ each represent hydrogen, an alkyl radical of 1 to 5 carbon atoms, a phenyl radical and substituted phenyl radicals having substituents selected from the group consisting of a halo radical, an alkyl radical of from 1 to 5 carbon atoms and an alkoxy radical having from 1 to 5 carbon atoms, or when taken together, the carbon atoms necessary to form a fused ring selected from the group of cyclopentane, benzene, and naphthalene, with an aryl compound selected from the group of alkoxy-substituted benzene compounds and alkoxy-substituted naphthalene compounds having from 1 to 5 carbon atoms in the alkyl moiety and having a hydrogen atom on the aryl nucleus, wherein when said aryl compound is benzene, said compound is at least meta-dialkoxy-substituted, said reaction being conducted in the presence of phosphorus oxychloride.

No references cited.

HENRY R. JILES, Primary Examiner

U.S. Cl. X.R.

96—1.5